(12) United States Patent
Meinhardt et al.

(10) Patent No.: US 12,017,952 B2
(45) Date of Patent: Jun. 25, 2024

(54) CHEMICALLY TEMPERED GLASS

(71) Applicant: SCHOTT AG, Mainz (DE)

(72) Inventors: Stefan Meinhardt, Neustadt an der Orla (DE); Rolf Weitnauer, Rothenstein (DE)

(73) Assignee: SCHOTT AG, Mainz (DE)

( * ) Notice: Subject to any disclaimer, the term of this patent is extended or adjusted under 35 U.S.C. 154(b) by 0 days.

(21) Appl. No.: 16/426,502

(22) Filed: May 30, 2019

(65) Prior Publication Data
US 2019/0276355 A1 Sep. 12, 2019

Related U.S. Application Data

(62) Division of application No. 15/233,809, filed on Aug. 10, 2016, now Pat. No. 10,351,471, which is a division of application No. 13/580,810, filed as application No. PCT/EP2011/000954 on Feb. 28, 2011, now abandoned.

(30) Foreign Application Priority Data

Feb. 26, 2010 (DE) .................... 10 2010 009 584.2

(51) Int. Cl.
C03C 21/00 (2006.01)
C03C 3/093 (2006.01)
C03C 3/097 (2006.01)
C03C 4/18 (2006.01)

(52) U.S. Cl.
CPC ............ *C03C 21/002* (2013.01); *C03C 3/093* (2013.01); *C03C 3/097* (2013.01); *C03C 4/18* (2013.01); *C03C 2204/00* (2013.01); *Y10T 428/315* (2015.01)

(58) Field of Classification Search
None
See application file for complete search history.

(56) References Cited

U.S. PATENT DOCUMENTS

| | | | |
|---|---|---|---|
| 3,357,876 A | 12/1967 | Rinehart | |
| 3,410,673 A | 11/1968 | Marusak | |
| 3,433,611 A * | 3/1969 | Kubichan | C03C 3/097 501/63 |
| 3,615,320 A | 10/1971 | Junge | |
| 3,798,013 A | 3/1974 | Inoue | |
| 4,156,755 A | 5/1979 | Rinehart | |
| 5,503,944 A | 4/1996 | Meyer | |
| 5,534,363 A | 7/1996 | Sprouse | |
| 5,846,280 A | 12/1998 | Speit | |
| 5,895,768 A | 4/1999 | Speit | |
| 5,928,793 A | 7/1999 | Kimura | |
| 6,187,441 B1 | 2/2001 | Takeuchi | |
| 6,303,245 B1 | 10/2001 | Nelson | |
| 6,365,534 B1 | 4/2002 | Koyama | |
| 7,566,673 B2 | 7/2009 | Kawai | |
| 9,199,876 B2 | 12/2015 | Wang | |
| 2001/0049041 A1 | 12/2001 | Buchner | |
| 2004/0163414 A1 | 8/2004 | Eto | |
| 2005/0250639 A1* | 11/2005 | Siebers | C03C 21/008 501/68 |
| 2007/0060465 A1 | 3/2007 | Varshneya | |
| 2008/0020919 A1 | 1/2008 | Murata | |
| 2009/0197088 A1* | 8/2009 | Murata | H01L 31/0392 428/410 |
| 2009/0280241 A1 | 11/2009 | Iwata | |
| 2010/0028607 A1 | 2/2010 | Lee | |
| 2010/0035745 A1* | 2/2010 | Murata | C03C 3/097 501/66 |
| 2010/0087307 A1 | 4/2010 | Murata | |
| 2010/0255350 A1* | 10/2010 | Endo | G11B 5/7315 428/846.9 |
| 2011/0014475 A1* | 1/2011 | Murata | C03C 3/085 428/410 |
| 2012/0052271 A1 | 3/2012 | Gomez | |

FOREIGN PATENT DOCUMENTS

| | | |
|---|---|---|
| DE | 4206268 | 11/1992 |
| DE | 19616633 | 5/1997 |
| DE | 19616679 | 5/1997 |
| EP | 0884289 | 12/1998 |
| JP | S62187140 | 8/1987 |
| JP | H10241134 | 9/1998 |
| JP | 2002174810 | 6/2002 |
| JP | 2004131314 | 4/2004 |
| WO | 9415377 | 7/1994 |
| WO | 0010209 | 2/2000 |
| WO | 2008149858 | 12/2008 |
| WO | 2010005578 | 1/2010 |

OTHER PUBLICATIONS

Symmons et al., p. 15 of Field Guide to Molded Optics, Symmons et al. downloaded Dec. 8, 2020. (Year: 2020).*
International Search Report dated Oct. 12, 2011 corresponding to International Patent Application No. PCT/EP2011/000954, 3 pages.
English Translation of International Preliminary Report on Patentability dated Aug. 28, 2012 corresponding to International Patent Application No. PCT/EP2011/000954, 8 pages.
English Translation of Written Opinion dated Oct. 12, 2011 corresponding to International Patent Application No. PCT/EP2011/000954, 6 pages.

* cited by examiner

*Primary Examiner* — David Sample
(74) *Attorney, Agent, or Firm* — Ruggiero McAllister & McMahon LLC

(57) ABSTRACT

Chemically tempered lithium aluminosilicate glasses and methods of tempering are provided. The method allows fast tempering at moderate temperatures, which leads to a deep zone of surface tension with a high level of surface tension.

34 Claims, No Drawings

CHEMICALLY TEMPERED GLASS

CROSS REFERENCE TO RELATED APPLICATIONS

This application is a division of U.S. application Ser. No. 15/233,809 filed on Aug. 10, 2016, now pending, which is a division of U.S. application Ser. No. 13/580,810 filed on Aug. 23, 2012, now abandoned, which is a national stage entry of International Application No. PCT/EP2011/000954 filed on Feb. 28, 2011, which claims benefit under 35 USC § 119 of German Application No. 10 2010 009 584.2 filed Feb. 26, 2010, the entire contents of all of which are incorporated herein by reference.

BACKGROUND

1. Field of the Invention

The invention generally relates to tempered glasses, in particular the invention relates to the chemical tempering of lithium aluminosilicate glasses. Chemical tempering or ion exchange by immersing a glass substrate into a potassium nitrate melt below the transformation temperature $T_G$ is generally known as a method to increase the strength of thin and very thin silicate or aluminosilicate glasses. Chemical tempering is preferably employed for sheets of glass having a thickness smaller than 4 mm. For special applications, thicker glass sheets may also be chemically tempered. In silicate or aluminosilicate glasses, an ion exchange typically only occurs between sodium ions in the glass and potassium ions in the salt melt. By such an exchange, surface compressive stresses with a depth of more than 80 μm are only achieved in very long exchange times of generally more than 12 hours.

2. Description of Related Art

Furthermore, it is generally known that the depth of ion exchange depends on the time of immersion in the salt bath and the temperature of the salt bath. Higher temperatures and longer durations increase the exchange depth. However, the exchange depth is not identical with the zone of surface compressive stress. Depending on which and how many ions penetrate into the glass, a different zone of surface compressive stress can result in function of the Li content and sodium content and their proportion to each other and to other components of the glass substrate. Typically, however, the zone of surface compressive stress extends deeper into the glass than the depth of the exchanged ions.

Commonly manufactured chemically tempered glasses in the market, such as aluminosilicate glass, or common soda lime glass usually have a $Na_2O$ content of more than 10% by weight, and by default are tempered in potassium nitrate salt baths at temperatures above 420° C., preferably about 430° C., and with tempering durations of more than 12 hours. The zone of surface compressive stress thereby reaches a depth of 30 to 70 μm. The amount of surface tension is between about 550 MPa in tempered soda lime glass, or of about 750 MPa in aluminosilicate glass.

For applications as cover glasses, however, there is the problem that scratches may easily extend further into the glass than the zone of surface tension, which results in a considerable reduction of strength.

Also, for applications as front and side windows of railway vehicles and bullet-proof glazing for vehicles, variably adjustable penetration depths of more than 80 μm and high strengths would be interesting, provided that acceptable short process times are feasible.

DE 196 16 633 C1 describes aluminosilicate glasses which, due to the chemical tempering, are suitable as substrate glasses for coating optical and magnetic storage media. Although deep toughened zones and high strengths are achievable in these glasses, long treatment durations of more than 12 hours in the salt melt and high temperatures of above 420° C. are required.

DE 196 16 679 C1 describes the chemical tempering of an aluminosilicate glass using a potassium nitrate melt at temperatures from 350° C. to 500° C. Although, according to Table 3, the described glass after about 1.5 hours of treatment exhibits a surface tension of 880 MPa, the thickness of the zone of compressive stress is only about 15 μm. To obtain a zone of compressive stress of 105 μm requires 15 hours of treatment in the salt melt.

U.S. Pat. No. 4,156,755 A describes $Li_2O$ containing aluminosilicate glasses for the ion exchange. Although it was possible with this glass to obtain zones of compressive stress with thicknesses of more than 80 μm in short times, the surface tension is not more than 600 MPa.

From EP 0 884 289 B1, a lithium aluminosilicate glass for vehicles is known which also may be chemically tempered. The $Li_2O$ content is from 3 to 4.5% by weight, and the $Na_2O$ content is between 6 and 13% by weight. According to Table 7 this glass, after 8 hours in a sodium nitrate melt of 380° C., achieves a zone of compressive stress of 80 μm thickness, but the surface tension is only 2600 $kg/cm^2$, which corresponds to about 255 MPa. Even after 64 hours in the melt, the tension is only 3450 $kg/cm^2$ corresponding to 339 MPa, with a thickness of surface tension of 30 μm, so that significantly thinner surface tension zones must be assumed in case of shorter times.

US 2007/0060465 A1 describes the chemical tempering of various lithium aluminosilicate glasses with a $Li_2O$ content from 3 to 9% and an $Na_2O+K_2O$ content of not more than 3%. The described glasses are exposed to temperatures between 450° C. and the annealing point.

WO 2010 005 578 A1 describes chemical tempering of aluminosilicate glasses for multiple times to provide a maximum of surface tension at a specific depth. Only the repeated tempering (single or mixed melts) and durations of significantly more than 8 hours result in zones of compressive stress with depths of more than 80 μm. Moreover, the obtained compressive stress, according to Table II, Example 13, with a depth of the zone of compressive stress of 81 μm is only 546 MPa. The process time to achieve such a compressive stress is more than 23 hours.

While during chemical tempering, generally, high interdiffusion coefficients in the ion exchange of ions having similar ionic radii result in deeper exchange depths in a relatively short time, the exchange with ions whose radius is significantly larger than the radius of the ion to be exchanged results in a stronger influence on the short-range order and thus to an increase of the surface compressive stress. This effect is stronger, the greater the difference of the two radii. An adjustment of the exchange depth with short process times is therefore made through a lithium-sodium cation exchange. However, if very high surface compressive stresses are required, the exchange may be realized with the cations of the heavier alkali metals. In this case, however, in function of the predetermined exchange depth and the cation used, long processing times and high process temperatures must be taken into account.

It will be evident from this discussion of the prior art that the glasses and methods for chemical tempering known from prior art do not permit quick tempering at moderate temperatures leading to a deep surface tension zone with a high level of surface tension.

SUMMARY

Therefore, it is an object of the invention to provide such glasses, or chemically tempered articles produced from such glasses. The invention provides a material for future applications as cover glasses and windows for vehicles, which is distinguished by a reduction of the tempering time and tempering temperature and simultaneously achieves an increase of the surface tension.

A chemically tempered glass article according to the invention, preferably in form of a glass sheet, is made of a lithium aluminosilicate glass, wherein the glass in addition to $SiO_2$ and $Al_2O_3$ which are characteristic for lithium aluminosilicate glass comprises: $Li_2O$ as a component with 4.6 to 5.4% by weight; and $Na_2O$ as a component with 8.1 to 9.7% by weight; and wherein the glass due to the chemical tempering has a zone of compressive stress at the surface; and the zone of compressive stress extends to a depth of at least 50 micrometers, preferably at least 80 micrometers into the glass, and wherein in the zone of compressive stress lithium ions are at least in part exchanged by other alkali ions; and wherein the zone of compressive stress exhibits a level of compressive stress of at least 600 MPa, preferably at least 800 MPa.

The measurements of strength were performed and determined using the double ring method according to EN 1288-5.

The surface tension or compressive stress in the zone of compressive stress can be determined photoelastically. To this end the glass samples are cut, and the surfaces are polished perpendicular to the viewing direction. Then the compressive stress in the surface can be determined by means of a microscope and various compensating elements.

The thickness/depth of the zone of compressive stress may also be determined photoelastically, at the cuts.

For the measurements of the exchange depth, Energy Dispersive X-ray (EDX) depth profiles of the alkali ions can be measured.

DETAILED DESCRIPTION

Glasses that have been found particularly suitable for the purpose of the invention have the following composition:
58 to 65% by weight of $SiO_2$;
16 to 20% by weight of $Al_2O_3$;
preferably 0.1 to 1% by weight of $B_2O_3$;
4.6 to 5.4% by weight of $Li_2O$;
8.1 to 9.7% by weight of $Na_2O$;
0.05 to 1.0% by weight of $K_2O$;
0.2 to 2.0% by weight of CaO;
2.5 to 5.0% by weight of $ZrO_2$; and optionally one or more of the components $SnO_2$, $CeO_2$, $P_2O_5$, and ZnO in a total proportion from 0 to 2.5% by weight.
A preferred composition range is:
60 to 62% by weight of $SiO_2$;
17.5 to 19.5% by weight of $Al_2O_3$;
0.5 to 0.7% by weight of $B_2O_3$;
4.8 to 5.2% by weight of $Li_2O$;
8.5 to 9.5% by weight of $Na_2O$;
0.2 to 0.5% by weight of $K_2O$;
0.5 to 1.2% by weight of CaO;
3.2 to 3.8% by weight of $ZrO_2$; and
$SnO_2$, $CeO_2$, $P_2O_5$, and ZnO in a total proportion from 0.25 to 1.6% by weight.

Particularly preferable for obtaining a deep zone of compressive stress with a high level of compressive stress already at comparatively low temperatures of the salt melt is the following composition:
61 to 62% by weight of $SiO_2$;
17.5 to 18.5% by weight of $Al_2O_3$;
0.5 to 0.7% by weight of $B_2O_3$;
4.9 to 5.1% by weight of $Li_2O$;
8.8 to 9.3% by weight of $Na_2O$;
0.2 to 0.5% by weight of $K_2O$;
0.5 to 1.2% by weight of CaO;
3.2 to 3.8% by weight of $ZrO_2$; and
$SnO_2$, $CeO_2$, $P_2O_5$, and ZnO in a total proportion from 0.5 to 1.0% by weight.

The invention especially allows to temper float glass panes having the corresponding compositions. In this refinement the tempered glass, accordingly, then has two non-polished surfaces. In other words, the top and bottom sides are not mechanically polished. Specifically, one surface is formed by fire polishing, the other is formed by flowing onto a liquid tin bath. A float glass pane may thus be identified by the fire-polished surface on the one hand, and by the tin impurities of the opposite side.

With the glasses as mentioned above, it is now possible to chemically temper the glass at temperatures below 420° C. and within a time of not more than 8 hours using one or more alkali-containing salt melt(s), preferably alkali nitrate melt(s). The obtained glasses may preferably be used as a cover glass for mobile communication devices, digital cameras, digital photo frames, personal digital assistants (PDAs), as a cover glass for solar energy devices, or as substrates for touch panel displays. Particularly preferred applications include bullet-proof glazing for ground vehicles as well as front and side windows for high speed trains. To achieve a thickness of the zone of compressive stress of more than 50 µm, preferably more than 80 µm, and surface tensions, or compressive stresses in the zone of compressive stress of more than 800 MPa, the process times in the salt melt, if necessary, may be reduced to not more than 4 hours, even to not more than 3 hours.

Accordingly, the invention also provides a method for producing a chemically tempered glass article, wherein a glass is provided which in addition to $SiO_2$ and $Al_2O_3$ comprises $Li_2O$ as a component with 4.6 to 5.4% by weight; and $Na_2O$ as a component with 8.1 to 9.7% by weight; and wherein the glass article is stored in an alkali-containing salt melt to exchange alkali ions of the glass with larger alkali ions of the salt melt and so to build up a zone of compressive stress at the surface of the glass article, so that a chemically tempered glass is obtained; wherein storing in the alkali-containing salt melt lasts for a time of not more than 8 hours; and wherein the temperature of the salt melt during storage of the glass article does not exceed 420° C.; and wherein a zone of compressive stress having a depth of at least 50 micrometers; and a compressive stress of at least 600 MPa is built up.

Several of the publications mentioned in the introductory part specify a certain proportion of $Li_2O$ or $Na_2O$ for the chemical tempering using alkali nitrates in order to achieve appropriate surface tensions and zones of compressive stress. Although previously surface tensions greater than 800 MPa have been produced, this was not in conjunction with a zone of compressive stress having a depth of more than 80 µm, and not within 8 h and below 430° C. Though US 2007/60465 A1 describes glasses with high levels of surface tension and deep tension zones, these are achieved at high temperatures of more than 450° C. and with Na$_2$O contents of less than 3% by weight. However, at these temperatures toxic nitrate vapors are already produced which impede normal processing. Furthermore, the high temperatures incur higher processing costs than temperatures of about 430° C. or below 420° C. Moreover, the process window gets very narrow, since in this case the annealing point of the glass is near the treatment temperature. Approaching the annealing temperature may result in a stress relief. Thus there is a risk for the compressive stress to become inhomogeneous.

In the study of lithium aluminosilicate glass substrates, a correlation was observed between the depth of the zone of compressive stress and the surface tension as well as the ions to be exchanged in chemical tempering.

In order to achieve depths of the zone of compressive stress of more than 80 μm within not more than 8 hours of treatment duration, the ionic radius of the penetrating ions should not differ significantly from that of the ions to be exchanged to ensure a fast exchange. Additionally, the ionic radius of the penetrating ions should not be significantly larger than the ionic radius of the compounds included in the glass substrate.

Ideal partners for an exchange with sodium ions or potassium ions with a high penetration rate are the Li ion or the Na ion. The Li ion has an ionic radius of about $1.45 \cdot 10^{-10}$ m, the Na ion has an ionic radius of about $1.8 \cdot 10^{-10}$ m. Other constituents of the glass have the following radii: Si ion about $1.1 \cdot 10^{-10}$ m, Al ion $1.25 \cdot 10^{-10}$ m, K ion $2.2 \cdot 10^{-10}$ m, and Zr ion $1.55 \cdot 10^{-10}$ m.

The larger inter-diffusion coefficient between lithium and sodium compared to the inter-diffusion coefficient between sodium and potassium, and the small difference between the ionic radii of the sodium ion and the lithium ion as well as the other constituents of the glass allows a high penetration rate. This results in rapid penetration of the glass substrate. The sodium ions fit better into the voids of a smaller volume, and due to their small size their penetration is not affected so much as with larger ionic radii of the other alkali metals.

If a potassium containing salt melt is used, there is not only an exchange of lithium ions which reflects in a lower lithium concentration in the zone of compressive stress. In this case, additionally, there is found an elevated potassium concentration in the zone of compressive stress, at least within portions thereof, as compared to the interior of the glass.

In order to achieve depths of more than 80 μm in an appropriate time of not more than 8 hours, the glass according to the invention should include at least a minimum proportion of Li$_2$O, preferably at least 4.6% by weight. More Li$_2$O leads to a faster exchange, however, a too high Li$_2$O content inhibits high surface tensions from building up. Therefore, on the other hand, the Li$_2$O content should not exceed 5.4% by weight. It has been found that with glasses having such lithium contents, surface tensions of more than 600 MPa or even more than 800 MPa can be achieved in short process times of not more than 8 hours.

According to the invention, an adjustment of the depth is preferably realized through the Li—Na exchange. An exchange only with alkali ions larger than sodium results in an increase of temperature to above 430° C., or prolongs the time to more than 8 hours in order to achieve the desired penetration depths.

However, to achieve surface tensions of more than 800 MPa, it is preferably suggested by the invention to involve further alkali ions in the exchange. These suitably include, for example, the Na ion in the glass and the K ion in the salt melt. Also, a participation of Cs ions and Rb ions is possible. The significantly larger ions from the salt melt lead to a significant increase of stress at the surface, and thus to an increase of surface tension. The various documents mentioned above describe Na$_2$O contents of up to 3%, or of more than 10%. However, Na$_2$O contents of less than 3% require temperatures of more than 450° C. to achieve surface tensions of about 800 MPa, as described, e.g., in US 2007/0060465 A1. Though with Na$_2$O contents of more than 10% by weight, about 700 to 800 MPa can be achieved, however this is at temperatures around 430° C. and in times of more than 8 hours. Studies of the employed glasses have revealed that, in contrast thereto, with Na$_2$O contents from 8.1 to 9.6% by weight, surface tensions of more than 800 MPa may result at temperatures below 420° C. and in times of not more than 8 hours.

Therefore, in order to obtain surface tensions of more than 600 MPa or even more than 800 MPa and zones of surface compressive stress (also known as Depth of Layer—DoL) with depths of more than 50 μm or even more than 80 μm at temperatures of the salt melt below 420° C. and within a treatment duration of not more than 8 hours, according to the invention the Li$_2$O content is selected between 4.6% and 5.4%, and the Na$_2$O content is selected between 8.1% and 9.7%.

It has been found that zones of compressive stress of more than 50 μm thickness and surface tensions of more than 600 MPa can be achieved in not more than 8 hours of treatment in the salt melt, when chemically tempering the above mentioned glasses according to the invention for a single time in a preferably pure (at least 95% purity) NaNO$_3$ melt at temperatures from 370° C. to 420° C. The tempering times herein are between 2 h and 8 h (see also Table 2 below; glasses 17 and 27). If, on the other hand, the glass substrate is tempered using a pure (at least 95% purity) KNO$_3$ melt at temperatures from 380° C. to 400° C., surface tensions of up to 1000 MPa are produced, but only depths of the zone of compressive stress (DoL) of 10 to 28 μm.

Accordingly, besides the compositions of the glasses used in chemical tempering, the choice of a respective melt and the process parameters such as temperature and exchange time are crucial for the desired material properties. As the above discussion demonstrates, the prior art allows only a limited combination of material properties, especially when short exchange times or low process temperatures are desired.

The method according to the invention, in contrast, allows to obtain both deep exchange depths and high levels of compressive stress within a relatively short time and at low process temperatures, in glasses with preferably the above mentioned compositions. This is preferably realized by exchanging at least two different alkali cation species, most preferably by a sequential process in which the glass article is successively chemically tempered in melts with different alkali cations. In this case, the first step preferably comprises a lithium-sodium exchange, while in the subsequent steps, preferably, melts with larger alkali cations are used. The method according to the invention thus provides an access to glasses with tailored properties.

In order to achieve surface tensions of more than 800 MPa and zones of compressive stress having a depth of more than 80 μm within not more than 8 hours of treatment duration, it is advantageous to perform a second (pure melt or melt blend), third (pure melt or melt blend) or fourth (pure melt or melt blend) step with one/several other alkali-NO$_3$ melts, wherein in this case the ionic radius of one of the alkali metals used in the second step should be larger than that in the first melt.

In the third or fourth step, the alkali ions may again be smaller than in the second step. Preferably in this case, potassium nitrate ($KNO_3$) should be used in the second step, but it is also possible to use other alkali metal salts. The temperatures employed in case of $KNO_3$ are preferably between 380° C. and 420° C. Advantageously, treatment durations of a maximum of 6 hours suffice for step 1 in a $NaNO_3$ melt. For step 2 using $KNO_3$ or $K_2SO_3$, 2 hours or even less can be scheduled according to a refinement of the invention. Steps 3 and 4 which are, optionally, additionally performed can be kept shorter than one hour in total. Thus, the sum of all steps is less than 8 hours, as exemplified by glasses 17 and 27 described in Table 3.

In a refinement of the invention it is therefore contemplated to successively perform the chemical tempering of the glass article in at least two alkali salt melts of different composition, which differ in particular in the contained alkali metal species, wherein the glass article is stored in the melts for a maximum of 8 hours in total, the temperature in each of the salt melts during tempering is lower than 420° C., and wherein a zone of compressive stress with a depth of more than 80 μm and a compressive stress of more than 800 MPa are obtained.

Another possibility to obtain surface tensions of more than 800 MPa and zones of compressive stress deeper than 80 μm within a maximum of 8 hours of treatment duration is to use mixed melts. These melt blends include salts of different alkali metals, preferably different alkali metal nitrates. To ensure the high penetration depths it is favorable to have a content of at least 15 wt.-%, preferably from 15 to 25 wt.-%, more preferably of about 20% by weight of $NaNO_3$ in the melt. The nitrate melt blend includes at least two different alkali ions, for example Na and K, or as well Na and Rb. But it is also possible that three or four different alkali metals are included.

Preferred melt blends are a mixture of $NaNO_3$ and $KNO_3$. The temperatures used with $NaNO_3$/$KNO_3$ are between 380° C. and 420° C. In this case, the time for the exchange process can also be kept at a maximum of 8 hours, as exemplified in Table 4 for glasses 17 and 27.

To achieve surface tensions of more than 1000 MPa, Rb ions or Cs ions may be used in chemical tempering. The method according to the invention thus offers the possibility to effectively incorporate alkali cations into the thus treated glass article, whose radii are significantly larger than the radius of the lithium cation, with short exchange times and relatively low process temperatures.

In order to obtain penetration depths of 50 μm or 80 μm and more in a short time, in particular in not more than 4 hours, according to the invention the alkali ion to be exchanged in the glass, $Li_2O$ and/or $Na_2O$ are present in sufficient quantities. The amount of $Li_2O$ is preferably in a range from 4.8 wt.-% to 5.2 wt.-%, and the amount of $Na_2O$ is preferably in a range from 8.5 wt.-% to 9.5 wt.-%.

These embodiments of the method according to the invention have in common that the chemical tempering of the glass article is performed in one or more melts, the melt(s) including at least two alkali ion species with different ionic radii.

In order to achieve exchange depths of more than 50 μm and surface tensions of more than 600 MPa within a maximum of 4 hours, it is also possible to temper the glass articles according to the invention for a single time in a pure (at least 95% purity) $NaNO_3$ melt at temperatures from 380° C. to 390° C. (see Table 2; glasses 19 and 25). The tempering times for obtaining such zones of compressive stress, in this case, are only between 2 and 4 hours. If the glass substrate is tempered using a pure (at least 95% purity) $KNO_3$ melt at temperatures from 380° C. to 400° C., surface tensions of up to 1000 MPa are obtained, but only DoLs from 10 μm to 28 μm.

However, to achieve even a surface tension of more than 800 MPa with zones of compressive stress deeper than 80 μm in not more than 4 hours, it is proposed to perform a second (pure melt or melt blend), optionally yet a third (pure melt or melt blend), optionally yet a fourth (pure melt or melt blend) step using one/several other alkali-$NO_3$ melts. It is advantageous in this case if the ionic radius of one type of the alkali ions in the melt employed in the second step is larger than in the first melt.

In the third or fourth step, the alkali ions may again be smaller than in the second step. Preferably, $KNO_3$ is used as a constituent of the melt in the second step, but it is also possible to use other alkali metal salts. The temperatures used with $KNO_3$ are preferably between 380° C. and 400° C.

To achieve fast tempering and a deep reaching zone of compressive stress, the following parameters are preferred: The tempering duration in the first step in a $NaNO_3$ melt is not more than 2 hours; the tempering duration in the second step using a $KNO_3$ melt is not more than 1.5 hours; the duration of the third and fourth steps is less than 0.5 hours in total.

In Table 3, glass 19 and glass 25 are given as examples for such a process.

Another possibility to obtain surface tensions >800 MPa and penetration depths >80 μm in less than 4 h is to use so-called melt blends. These mixed melts are composed of different alkali metal nitrates. To ensure the high penetration depths, an alkali metal salt melt with at least 15 wt.-%, preferably from 15 to 25 wt.-%, more preferably about 20 wt.-% of $NaNO_3$ is used. The nitrate melt blend includes at least two different alkali ion species, for example Na and K, or as well Na and Rb. However, it may include 3 or 4 different alkali metals.

Preferred melt blends are mixtures of $NaNO_3$ and $KNO_3$. The temperatures used for $NaNO_3$/$KNO_3$ are between 380° C. and 400° C. The time required for the exchange process is less than 4 h (see Table 4; glasses 19 and 25).

Particularly short treatment times of 4 hours or less may be achieved as follows:

In order to achieve penetration depths of 50 μm or 80 μm and more in a short time of not more than 3 hours, again a glass is used which comprises the alkali ion to be exchanged in the glass, Li or Na, in a sufficient quantity. Therefore, the amount of $Li_2O$ is preferably from 4.9 wt.-% to 5.1 wt.-%, and the amount of $Na_2O$ is preferably between 8.8 wt.-% and 9.5 wt.-%.

In order to obtain exchange depths >50 μm and surface tensions >600 MPa in less than 3 hours, the above-mentioned glass bodies may be chemically tempered in a pure (at least 95% purity) $NaNO_3$ melt for a single time, at temperatures from 380° C. to 385° C. The tempering time may even be reduced to two to three hours. An example is given in Table 2 for glass 22. When the glass substrate is tempered using a pure (at least 95% purity) $KNO_3$ melt at temperatures from 380° C. to 400° C., surface tensions of up to 1000 MPa are obtained, but only DoLs (depths of the zones of compressive stress) from 10 μm to 28 m.

To achieve even a surface tension of more than 750 MPa, preferably more than 800 MPa, and zones of compressive stress of a thickness or depth of more than 80 μm in not more than 3 hours, the invention in one embodiment thereof contemplates to perform of the chemical tempering of the glass article in at least two steps in alkali salt melts of different compositions, with a salt being used in a second salt melt which includes alkali ions having a larger ionic radius than the alkali ions of the melt used in the first step, wherein the temperature of the melts during tempering is less than 400° C. In this case, the total storage time of the glass article in all salt melts is not more than 3 hours.

Specifically, in a refinement of this embodiment of the invention, the second step in a pure melt or melt blend is followed by a third step in a pure melt or melt blend, and optionally by a fourth step in a pure melt or melt blend. Preferably, alkali nitrate melts are used, wherein the ionic radius of one species of the alkali ions used in the second step, according to yet another refinement of the invention, is larger than that of the first melt.

In the third or fourth step, the alkali ions may again be smaller than in the second step. Preferably, here, a potassium salt, more preferably $KNO_3$ may be used as a second step, but it is also possible to use other alkali metal salts, alternatively or additionally. The temperatures used with $KNO_3$ are preferably between 380° C. and 390° C. The following parameters have been found to be advantageous in this embodiment of the method according to the invention: In the first step in a $NaNO_3$ melt, the exchange time in the melt is not more than 1.5 hours. For the second step a $KNO_3$ melt is used, in which case the storage time in the melt is not more than 1.0 hours. The duration of steps 3 and 4 is less than 0.5 hours in total. An example for this method is given in Table 3 for glass 22.

Another possibility to obtain surface tensions or levels of compressive stress in the zone of compressive stress of more than 800 MPa and penetration depths or zones of compressive stress having a depth of more than 80 μm within 3 hours or less is to use so-called melt blends. These mixed melts are composed of different alkali metal salts, preferably alkali metal nitrates. To ensure the high penetration depths, preferably at least 15% by weight of $NaNO_3$ is used in the melt. The nitrate melt blend includes at least two different alkali ions, for example Na and K, or as well Na and Rb. However, it may include 3 or 4 different alkali metals. A temperature of less than 400° C. is generally sufficient to establish a zone of compressive stress as mentioned above.

Preferred melt blends for this purpose are mixtures of $NaNO_3$ and $KNO_3$. The temperatures used with such a $NaNO_3$—$KNO_3$ melt are preferably between 380° C. and 390° C. The exchange process for obtaining a zone of compressive stress with a level of more than 800 MPa of compressive stress and a depth of the zone of compressive stress of more than 80 μm requires a time of not more than 3 hours. An example for this method is given in Table 4 for glass 22.

Now, the attached tables with the exemplary embodiments will be explained in detail. Table 1 shows compositions for 16 glasses which can be used for the invention. The compositions are given in percent by weight. Furthermore given are the density ρ, the linear thermal expansion coefficient α, the glass transition temperature Tg, and the temperatures at which the viscosity η of the glass is $10^4$ Pa·s, $10^{7.6}$ Pa·s, and $10^{13}$ Pa·s, and the modulus of elasticity, shear modulus, and Knoop hardness.

In addition, the ion-exchange conditions are indicated. Specifically, potassium nitrate, sodium nitrate, or potassium nitrate/sodium nitrate melt blends were used in these exemplary embodiments. The proportions of $KNO_3$ and $NaNO_3$ in the melt composition are each indicated in percent by weight. Furthermore, the respective temperatures of the salt melts are listed.

In all cases, the tempering duration was 8 hours.

Glasses 1 through 4 were tempered in pure sodium nitrate melts. For glasses 5 through 8, a pure potassium nitrate melt was used, and for glasses 9 through 16 a sodium nitrate/potassium nitrate melt blend.

The highest compressive stresses were obtained in glasses 5 to 8, i.e. glasses that were tempered in a potassium nitrate melt. Also the flexural strength ("Modulus of Rupture"—MOR) exhibits the highest levels in these glasses. Surprisingly, however, the other glasses exhibit advantageous mechanical properties that make them particularly suitable for glazing of high-speed railway vehicles, among other uses.

For the field of vehicle glazing, such as for high-speed trains or glazing for bullet-proof vehicles, the glasses must pass a variety of tests.

The windshield glass of high-speed trains must resist the so-called Rock Strike test (RS942612). This test is intended to simulate stone chipping at high speeds. A pointed aluminum profile with a weight of 20 g is fired at the glass sheet with 400 km/h. The glass must not break.

Table 1 indicates the maximum realized speed to which these glasses resist in the above-described rock strike test, for glass 7, glass 11, and glass 15. Surprisingly, glasses 11 and 15, with 440 km/h and 540 km/h, respectively, resist to much higher speeds than glass 7 with 290 km/h, although glass 7 exhibits a significantly higher compressive stress (870 MPa, as compared to 730 MPa for glass 11, and 799 MPa for glass 15). The better resistance of glasses 11 and 15 is due to the deep zone of compressive stress according to the invention. While the exchange depths in glasses 11 and 15 according to the invention exceed 80 μm (92 μm in glass 11, and 87 μm in glass 15), the exchange depth in glass 7 is only 16 μm.

Table 2 shows the properties of glass articles according to the invention after a single-step chemical tempering of different durations in an $NaNO_3$ melt. Glass 27 has the lowest contents of $Li_2O$ and $Na_2O$. In this glass, a compressive stress of 600 MPa is just reached after 8 hours in the melt. Even glass 17 with the highest contents of $Li_2O$ and $Na_2O$ requires a tempering duration of about 8 hours in this melt to obtain a compressive stress of 600 MPa.

The glasses having average contents of $Li_2O$ and $Na_2O$ can even be tempered faster. For example in glass 22 having a $Li_2O$ content of 5 wt.-% and a $Na_2O$ content of 9.48 wt.-%, a high level of compressive stress of 650 MPa is already achieved after 3 hours of storage in the salt melt. In each of the glasses, accordingly, a single-step chemical tempering in the $NaNO_3$ melt at temperatures in a range from 370° C. to 420° C. established a zone of compressive stress of more than 50 am thickness with a surface tension of more than 600 MPa within a maximum of 8 hours of treatment in the salt melt.

Table 3 shows the mechanical properties of the glasses also listed in Table 2 after a two-step chemical tempering. The glasses were tempered in a first step in a $NaNO_3$ melt, and in a subsequent, second step in a $KNO_3$ melt. Accordingly, here, chemical tempering of the glass articles was performed in a plurality of melts, wherein the melts included at least two alkali ion species with different ionic radii. Specifically, chemical tempering of the glass article was performed successively in two alkali salt melts of different compositions which differed in the included alkali metal species, and the glass article was stored in the melts for a maximum of 8 hours in total.

The durations of storage were varied as indicated in Table 3. As can be seen from Table 3, in all glasses a compressive stress of more than 700 MPa, in particular also more than 800 MPa and a depth of the zone of compressive stress of more than 80 μm is achieved by the two-step tempering which uses a salt in the second salt melt that comprises alkali ions which have a larger ionic radius than the alkali ions of the melt used in the first step (K ions versus Na ion), at melt temperatures of less than 400° C., and within 8 hours.

In glass 22, even a surface tension of more than 800 MPa (841 MPa) and a zone of compressive stress of a thickness of more than 80 μm (82 μm) could be built up at a temperature of the salt melt of less than 400° C. and within a total time of storage of the glass article in all salt melts of not more than 3 hours.

Moreover, it can be seen that in the glasses according to the invention the compressive stress even decreases again with tempering times of more than 8 hours.

Table 4 lists exemplary embodiments of the invention, in which a surface tension of more than 800 MPa and zones of compressive stress deeper than 80 μm are obtained in less than 8 hours of treatment duration by using a melt blend for chemical tempering, wherein the melt blend comprises salts of different alkali metals and has a content of at least 20 percent by weight of $NaNO_3$. The same glass compositions were used as in the exemplary embodiments of Tables 2 and 3. For the salt melt, a mixture of 20 wt.-% of sodium nitrate and 80 wt.-% of potassium nitrate was used.

Specifically, in all glasses a zone of compressive stress of more than 80 μm corresponding to the measured exchange depth and a level of compressive stress of more than 800 MPa was achieved in the melt blend within a maximum of 8 hours of tempering duration and at temperatures of less than 400° C. Here, similarly to the exemplary embodiments listed in Table 3, it can be seen that with longer treatment durations of 12 hours, although the zone of compressive stress is somewhat deepening, the compressive stress even decreases again.

Glasses 19, 22, and 25 achieve a level of surface tension of more than 800 MPa with depths of the zone of compressive stress of more than 80 μm already after 4 hours of tempering duration. In glass 22, these levels are even reached after 3 hours of storage in the melt.

From the above examples it will be clear that glasses according to the invention having contents of Li and Na according to the invention can be tempered particularly quickly with deep zones of compressive stress when using a sodium containing salt melt, preferably a sodium nitrate containing salt melt for the chemical tempering of the glass article.

TABLE 2 different glass compositions and properties after single-step chemical tempering of different duration using $NaNO_3$

| | glass 17 | glass 18 | glass 19 | glass 20 | glass 21 | glass 22 | glass 23 | glass 24 | glass 25 | glass 26 | glass 27 |
|---|---|---|---|---|---|---|---|---|---|---|---|
| glass composition [wt.-%] | | | | | | | | | | | |
| $SiO_2$ | 61.8 | 61.9 | 61.8 | 61.9 | 61.9 | 61.9 | 62.0 | 62.0 | 61.9 | 62.0 | 62.0 |
| $B_2O_3$ | 0.15 | 0.15 | 0.15 | 0.15 | 0.15 | 0.2 | 0.2 | 0.3 | 0.5 | 0.6 | 0.6 |
| $Al_2O_3$ | 17.9 | 17.8 | 17.9 | 17.8 | 17.9 | 17.9 | 17.8 | 17.8 | 17.8 | 17.8 | 17.8 |
| $Li_2O$ | 5.4 | 5.3 | 5.2 | 5.1 | 5.05 | 5 | 4.95 | 4.9 | 4.8 | 4.7 | 4.6 |
| $Na_2O$ | 9.7 | 9.6 | 9.6 | 9.5 | 9.5 | 9.48 | 9.45 | 8.85 | 8.5 | 8.1 | 8.1 |
| $K_2O$ | 0.07 | 0.075 | 0.07 | 0.075 | 0.08 | 0.1 | 0.15 | 0.2 | 0.3 | 0.4 | 0.4 |
| $P_2O_5$ | 0.03 | 0.05 | 0.03 | 0.05 | 0.075 | 0.1 | 0.15 | 0.2 | 0.3 | 0.4 | 0.4 |
| MgO | — | — | — | — | — | — | — | — | 0.02 | 0.03 | 0.03 |
| CaO | 0.6 | 0.7 | 0.6 | 0.7 | 0.75 | 0.8 | 0.85 | 0.09 | 1 | 1.2 | 1.3 |
| SrO | 0.07 | 0.08 | 0.07 | 0.08 | 0.09 | 0.1 | 0.11 | 0.12 | 0.14 | 0.18 | 0.18 |
| $ZrO_2$ | 3.5 | 3.5 | 3.6 | 3.6 | 3.6 | 3.6 | 3.6 | 3.7 | 3.7 | 3.7 | 3.7 |
| ZnO | 0.07 | 0.08 | 0.07 | 0.08 | 0.08 | 0.08 | 0.09 | 0.11 | 0.13 | 0.16 | 0.16 |
| $SnO_2$ | 0.05 | 0.05 | 0.1 | 0.1 | 0.1 | 0.1 | 0.1 | 0.1 | 0.1 | 0.1 | 0.15 |
| $CeO_2$ | 0.05 | 0.05 | 0.1 | 0.1 | 0.1 | 0.1 | 0.1 | 0.1 | 0.12 | 0.16 | 0.2 |
| $Fe_2O_3$ | 0.1 | 0.1 | 0.1 | 0.1 | 0.1 | 0.1 | 0.095 | 0.09 | 0.08 | 0.07 | 0.07 |
| chemical tempering: | | | | | | | | | | | |
| with 99% $NaNO_3$ 380° C. 3 h | | | | | | | | | | | |
| surface tension | 570 MPa | 587 MPa | | 650 MPa | | | | | 610 MPa | | 560 MPa |
| MOR | 540 MPa | 568 MPa | | 607 MPa | | | | | 594 MPa | | 521 MPa |
| exchange depth | 90 μm | 91 μm | | 89 μm | | | | | 70 μm | | 63 μm |
| with 99% $NaNO_3$ 380° C. 4 h | | | | | | | | | | | |
| surface tension | 580 MPa | 620 MPa | | 640 MPa | | | | | 615 MPa | | 580 MPa |
| MOR | 546 MPa | 571 MPa | | 604 MPa | | | | | 578 MPa | | 536 MPa |
| exchange depth | 110 μm | 99 μm | | 92 μm | | | | | 86 μm | | 80 μm |
| with 99% $NaNO_3$ 380° C. 8 h | | | | | | | | | | | |
| surface tension | 610 MPa | 602 MPa | | 600 MPa | | | | | 603 MPa | | 600 MPa |
| MOR | 579 MPa | 562 MPa | | 576 MPa | | | | | 553 MPa | | 514 MPa |
| exchange depth | 140 μm | 132 μm | | 119 μm | | | | | 112 μm | | 110 μm |
| with 99% $NaNO_3$ 380° C. 12 h | | | | | | | | | | | |
| surface tension | 540 MPa | 550 MPa | | 550 MPa | | | | | 540 MPa | | 530 MPa |
| MOR | 529 MPa | 532 MPa | | 535 MPa | | | | | 521 MPa | | 507 MPa |
| exchange depth | 170 μm | 159 μm | | 150 μm | | | | | 142 μm | | 135 μm |

TABLE 1

| GLASSES (laboratory melts) | | | | | | | | | | |
|---|---|---|---|---|---|---|---|---|---|---|
| | | 1 | 2 | 3 | 4 | 5 | 6 | 7 | 8 | 9 |
| composition | wt.-% | | | | | | | | | |
| SiO$_2$ | | 61.8 | 61.9 | 62.0 | 61.9 | 61.8 | 61.9 | 62.0 | 61.9 | 61.8 |
| B$_2$O$_3$ | | 0.15 | 0.20 | 0.3 | 0.5 | 0.15 | 0.20 | 0.3 | 0.5 | 0.15 |
| AL$_2$O$_3$ | | 17.9 | 17.9 | 17.8 | 17.8 | 17.9 | 17.9 | 17.8 | 17.8 | 17.9 |
| Li$_2$O | | 5.15 | 5.05 | 4.90 | 4.90 | 5.15 | 5.05 | 4.90 | 4.90 | 5.15 |
| Na$_2$O | | 9.7 | 9.5 | 8.9 | 8.5 | 9.7 | 9.5 | 8.9 | 8.5 | 9.7 |
| K$_2$O | | 0.07 | 0.08 | 0.095 | 0.1 | 0.07 | 0.08 | 0.095 | 0.1 | 0.07 |
| P$_2$O$_5$ | | 0.03 | 0.075 | 0.2 | 0.3 | 0.03 | 0.075 | 0.2 | 0.3 | 0.03 |
| MgO | | — | — | — | 0.02 | — | — | — | 0.02 | — |
| CaO | | 0.6 | 0.75 | 0.9 | 1 | 0.6 | 0.75 | 0.9 | 1 | 0.6 |
| SrO | | 0.07 | 0.09 | 0.12 | 0.14 | 0.07 | 0.09 | 0.12 | 0.14 | 0.07 |
| ZnO | | 0.07 | 0.08 | 0.11 | 0.13 | 0.07 | 0.08 | 0.11 | 0.13 | 0.07 |
| ZrO$_2$ | | 3.60 | 3.60 | 3.70 | 3.80 | 3.60 | 3.60 | 3.70 | 3.80 | 3.60 |
| CeO$_2$ | | 0.1 | 0.1 | 0.1 | 0.12 | 0.1 | 0.1 | 0.1 | 0.12 | 0.1 |
| SnO$_2$ | | 0.1 | 0.1 | 0.1 | 0.1 | 0.1 | 0.1 | 0.1 | 0.1 | 0.1 |
| Fe$_2$O$_3$ | | 0.1 | 0.1 | 0.09 | 0.08 | 0.1 | 0.1 | 0.09 | 0.08 | 0.1 |
| ρ | g · cm$^{-3}$ | 2.4880 | 2.4884 | 2.4805 | 2.4763 | 2.4880 | 2.4884 | 2.4805 | 2.4763 | 2.4880 |
| α | 10$^{-6}$ K$^{-1}$ | 8.70 | 8.50 | 8.3 | 8.2 | 8.70 | 8.50 | 8.3 | 8.2 | 8.70 |
| Tg | ° C. | 502 | 505 | 520 | 525 | 502 | 505 | 520 | 525 | 5.02 |
| lgη = 4 | | 1060 | 1066 | 1074 | 1089 | 1060 | 1066 | 1074 | 1089 | 1060 |
| lgη = 7.6 | | 715 | 718 | 726 | 737 | 715 | 718 | 726 | 737 | 715 |
| lgη = 13 | | 512 | 515 | 522 | 536 | 512 | 515 | 522 | 536 | 512 |
| modulus of elasticity | GPa | 83.5 | 83.3 | 84.6 | 83.7 | 83.5 | 83.3 | 84.6 | 83.7 | 83.5 |
| shear modulus | GPa | 64 | 34.1 | 34.1 | 33.8 | 64 | 34.1 | 34.1 | 33.8 | 64 |
| Knoop hardness | | 640 | 650 | 640 | 630 | 640 | 650 | 640 | 630 | 640 |
| ion-exchange conditions | | | | | | | | | | |
| NaNO$_3$ | mol-% | 100 | 100 | 100 | 100 | | | | | 50 |
| KNO$_3$ | mol-% | | | | | 100 | 100 | 100 | 100 | 50 |
| temperature | ° C. | 380 | 380 | 380 | 380 | 390 | 390 | 390 | 390 | 385 |
| compressive stress [MPa] | | 600 | 608 | 604 | 600 | 910 | 905 | 870 | 850 | 754 |
| exchange depth | μm | 132 | 115 | 109 | 100 | 21 | 18 | 16 | 14 | 110 |
| MOR | MPa | 562 | 576 | 554 | 514 | 850 | 855 | 800 | 795 | 720 |
| rock strike test max. speed without breaking | km/h | | | | | | | 290 | | |

| | | 10 | 11 | 12 | 13 | 14 | 15 | 16 |
|---|---|---|---|---|---|---|---|---|
| composition | wt.-% | | | | | | | |
| SiO$_2$ | | 61.9 | 62.0 | 61.9 | 61.8 | 61.9 | 62.0 | 61.9 |
| B$_2$O$_3$ | | 0.20 | 0.3 | 0.5 | 0.15 | 0.20 | 0.3 | 0.5 |
| AL$_2$O$_3$ | | 17.9 | 17.8 | 17.8 | 17.9 | 17.9 | 17.8 | 17.8 |
| Li$_2$O | | 5.05 | 4.90 | 4.90 | 5.15 | 5.05 | 4.90 | 4.90 |
| Na$_2$O | | 9.5 | 8.9 | 8.5 | 9.7 | 9.5 | 8.9 | 8.5 |
| K$_2$O | | 0.08 | 0.095 | 0.1 | 0.07 | 0.08 | 0.095 | 0.1 |
| P$_2$O$_5$ | | 0.075 | 0.2 | 0.3 | 0.03 | 0.075 | 0.2 | 0.3 |
| MgO | | — | — | 0.02 | — | — | — | 0.02 |
| CaO | | 0.75 | 0.9 | 1 | 0.6 | 0.75 | 0.9 | 1 |
| SrO | | 0.09 | 0.12 | 0.14 | 0.07 | 0.09 | 0.12 | 0.14 |
| ZnO | | 0.08 | 0.11 | 0.13 | 0.07 | 0.08 | 0.11 | 0.13 |
| ZrO$_2$ | | 3.60 | 3.70 | 3.80 | 3.60 | 3.60 | 3.70 | 3.80 |
| CeO$_2$ | | 0.1 | 0.1 | 0.12 | 0.1 | 0.1 | 0.1 | 0.12 |
| SnO$_2$ | | 0.1 | 0.1 | 0.1 | 0.1 | 0.1 | 0.1 | 0.1 |
| Fe$_2$O$_3$ | | 0.1 | 0.09 | 0.08 | 0.1 | 0.1 | 0.09 | 0.08 |
| ρ | g · cm$^{-3}$ | 2.4884 | 2.4805 | 2.4763 | 2.4880 | 2.4884 | 2.4805 | 2.4763 |
| α | 10$^{-6}$ K$^{-1}$ | 8.50 | 8.3 | 8.2 | 8.70 | 8.50 | 8.3 | 8.2 |
| Tg | ° C. | 505 | 520 | 525 | 5.02 | 505 | 520 | 525 |
| lgη = 4 | | 1066 | 1074 | 1089 | 1060 | 1066 | 1074 | 1089 |
| lgη = 7.6 | | 718 | 726 | 737 | 715 | 718 | 726 | 737 |
| lgη = 13 | | 515 | 522 | 536 | 512 | 515 | 522 | 536 |
| modulus of elasticity | GPa | 83.3 | 84.6 | 83.7 | 83.5 | 83.3 | 84.6 | 83.7 |
| shear modulus | GPa | 34.1 | 34.1 | 33.8 | 64 | 34.1 | 34.1 | 33.8 |
| Knoop hardness | | 650 | 640 | 630 | 640 | 650 | 640 | 630 |
| ion-exchange conditions | | | | | | | | |
| NaNO$_3$ | mol-% | 50 | 50 | 50 | 20 | 20 | 20 | 20 |
| KNO$_3$ | mol-% | 50 | 50 | 50 | 80 | 80 | 80 | 80 |
| temperature | ° C. | 385 | 385 | 385 | 390 | 390 | 390 | 390 |

TABLE 1-continued

GLASSES (laboratory melts)

| | | | | | | | | |
|---|---|---|---|---|---|---|---|---|
| compressive stress [MPa] | | 755 | 730 | 701 | 840 | 821 | 799 | 790 |
| exchange depth | μm | 99 | 92 | 87 | 101 | 94 | 87 | 81 |
| MOR | MPa | 725 | 701 | 650 | 799 | 758 | 764 | 732 |
| rock strike test max. speed without breaking | km/h | | 440 | | | | 540 | |

TABLE 3 properties of different glasses after two-step chemical tempering

| | glass 17 | glass 18 | glass 19 | glass 20 | glass 21 | glass 22 | glass 23 | glass 24 | glass 25 | glass 26 | glass 27 |
|---|---|---|---|---|---|---|---|---|---|---|---|
| | | | | | glass composition | | | | | | |
| $SiO_2$ | 61.8 | 61.9 | 61.8 | 61.9 | 61.9 | 61.9 | 62.0 | 62.0 | 61.9 | 62.0 | 62.0 |
| $B_2O_3$ | 0.15 | 0.15 | 0.15 | 0.15 | 0.2 | 0.2 | 0.2 | 0.3 | 0.5 | 0.6 | 0.6 |
| $Al_2O_3$ | 17.9 | 17.8 | 17.9 | 17.8 | 17.9 | 17.9 | 17.8 | 17.8 | 17.8 | 17.8 | 17.8 |
| $Li_2O$ | 5.4 | 5.3 | 5.2 | 5.1 | 5.05 | 5 | 4.95 | 4.9 | 4.8 | 4.7 | 4.6 |
| $Na_2O$ | 9.7 | 9.6 | 9.6 | 9.5 | 9.5 | 9.48 | 9.45 | 8.85 | 8.5 | 8.1 | 8.1 |
| $K_2O$ | 0.07 | 0.075 | 0.07 | 0.075 | 0.08 | 0.1 | 0.15 | 0.2 | 0.3 | 0.4 | 0.4 |
| $P_2O_5$ | 0.03 | 0.05 | 0.03 | 0.05 | 0.075 | 0.1 | 0.15 | 0.2 | 0.3 | 0.4 | 0.4 |
| MgO | — | — | — | — | — | — | — | — | 0.02 | 0.03 | 0.03 |
| CaO | 0.6 | 0.7 | 0.6 | 0.7 | 0.75 | 0.8 | 0.85 | 0.09 | 1 | 1.2 | 1.3 |
| SrO | 0.07 | 0.08 | 0.07 | 0.08 | 0.09 | 0.1 | 0.11 | 0.12 | 0.14 | 0.18 | 0.18 |
| $ZrO_2$ | 3.5 | 3.5 | 3.6 | 3.6 | 3.6 | 3.6 | 3.6 | 3.7 | 3.7 | 3.7 | 3.7 |
| ZnO | 0.07 | 0.08 | 0.07 | 0.08 | 0.08 | 0.08 | 0.09 | 0.11 | 0.13 | 0.16 | 0.16 |
| $SnO_2$ | 0.05 | 0.05 | 0.1 | 0.1 | 0.1 | 0.1 | 0.1 | 0.1 | 0.1 | 0.1 | 0.15 |
| $CeO_2$ | 0.05 | 0.05 | 0.1 | 0.1 | 0.1 | 0.1 | 0.1 | 0.1 | 0.12 | 0.16 | 0.2 |
| $Fe_2O_3$ | 0.1 | 0.1 | 0.1 | 0.1 | 0.1 | 0.1 | 0.095 | 0.09 | 0.08 | 0.07 | 0.07 | with 99% $NaNO_3$ 390° C. 2 h (1$^{st}$ step), and with 99% $KNO_3$ 390° C. 1 h (2$^{nd}$ step)

| | glass 17 | glass 18 | glass 19 | glass 20 | glass 21 | glass 22 | glass 23 | glass 24 | glass 25 | glass 26 | glass 27 |
|---|---|---|---|---|---|---|---|---|---|---|---|
| surface tension | 764 MPa | 788 MPa | | | 841 MPa | | | | 743 MPa | | 732 MPa |
| MOR | 715 MPa | 738 MPa | | | 812 MPa | | | | 709 MPa | | 696 MPa |
| zone of compressive stress | 88 μm | 85 μm | | | 82 μm | | | | 80 μm | | 63 μm | with 99% $NaNO_3$ 390° C. 2 h (1$^{st}$ step), and with 99% $KNO_3$ 390° C. 1.5 h (2$^{nd}$ step)

| | glass 17 | glass 18 | glass 19 | glass 20 | glass 21 | glass 22 | glass 23 | glass 24 | glass 25 | glass 26 | glass 27 |
|---|---|---|---|---|---|---|---|---|---|---|---|
| surface tension | 784 MPa | 811 MPa | | | 823 MPa | | | | 804 MPa | | 761 MPa |
| MOR | 732 MPa | 762 MPa | | | 793 MPa | | | | 765 MPa | | 722 MPa |
| zone of compressive stress | 88 μm | 85 μm | | | 81 μm | | | | 80 μm | | 70 μm | with 99% $NaNO_3$ 390° C. 4 h (1$^{st}$ step), and with 99% $KNO_3$ 390° C. 3 h (2$^{nd}$ step)

| | glass 17 | glass 18 | glass 19 | glass 20 | glass 21 | glass 22 | glass 23 | glass 24 | glass 25 | glass 26 | glass 27 |
|---|---|---|---|---|---|---|---|---|---|---|---|
| surface tension | 808 MPa | 803 MPa | | | 811 MPa | | | | 804 MPa | | 803 MPa |
| MOR | 754 MPa | 749 MPa | | | 771 MPa | | | | 758 MPa | | 776 MPa |
| zone of compressive stress | 116 μm | 107 μm | | | 101 μm | | | | 90 μm | | 85 μm | with 99% $NaNO_3$ 390° C. 4 h (1$^{st}$ step), and with 99% $KNO_3$ 390° C. 6 h

TABLE 3-continued properties of different glasses after two-step chemical tempering

| | glass 17 | glass 18 | glass 19 | glass 20 | glass 21 | glass 22 | glass 23 | glass 24 | glass 25 | glass 26 | glass 27 |
|---|---|---|---|---|---|---|---|---|---|---|---|
| (2$^{nd}$ step) | | | | | | | | | | | |
| surface tension | 793 MPa | | 786 MPa | | | 774 MPa | | | 770 MPa | | 775 MPa |
| MOR | 743 MPa | | 748 MPa | | | 753 MPa | | | 734 MPa | | 742 MPa |
| zone of compressive stress | 115 μm | | 107 μm | | | 103 μm | | | 90 μm | | 85 μm |

TABLE 4 properties of different glasses after two-step chemical tempering

| | glass 17 | glass 18 | glass 19 | glass 20 | glass 21 | glass 22 | glass 23 | glass 24 | glass 25 | glass 26 | glass 27 |
|---|---|---|---|---|---|---|---|---|---|---|---|
| chemical composition | | | | | | | | | | | |
| $SiO_2$ | 61.8 | 61.9 | 61.8 | 61.9 | 61.9 | 61.9 | 62.0 | 62.0 | 61.9 | 62.0 | 62.0 |
| $B_2O_3$ | 0.15 | 0.15 | 0.15 | 0.15 | 0.15 | 0.2 | 0.2 | 0.3 | 0.5 | 0.6 | 0.6 |
| $Al_2O_3$ | 17.9 | 17.8 | 17.9 | 17.8 | 17.9 | 17.9 | 17.8 | 17.8 | 17.8 | 17.8 | 17.8 |
| $Li_2O$ | 5.4 | 5.3 | 5.2 | 5.1 | 5.05 | 5 | 4.95 | 4.9 | 4.8 | 4.7 | 4.6 |
| $Na_2O$ | 9.7 | 9.6 | 9.6 | 9.5 | 9.5 | 9.48 | 9.45 | 8.85 | 8.5 | 8.1 | 8.1 |
| $K_2O$ | 0.07 | 0.075 | 0.07 | 0.075 | 0.08 | 0.1 | 0.15 | 0.2 | 0.3 | 0.4 | 0.4 |
| $P_2O_5$ | 0.03 | 0.05 | 0.03 | 0.05 | 0.075 | 0.1 | 0.15 | 0.2 | 0.3 | 0.4 | 0.4 |
| MgO | — | — | — | — | — | — | — | — | 0.02 | 0.03 | 0.03 |
| CaO | 0.6 | 0.7 | 0.6 | 0.7 | 0.75 | 0.8 | 0.85 | 0.09 | 1 | 1.2 | 1.3 |
| SrO | 0.07 | 0.08 | 0.07 | 0.08 | 0.09 | 0.1 | 0.11 | 0.12 | 0.14 | 0.18 | 0.18 |
| $ZrO_2$ | 3.5 | 3.5 | 3.6 | 3.6 | 3.6 | 3.6 | 3.6 | 3.7 | 3.7 | 3.7 | 3.7 |
| ZnO | 0.07 | 0.08 | 0.07 | 0.08 | 0.08 | 0.08 | 0.09 | 0.11 | 0.13 | 0.16 | 0.16 |
| $SnO_2$ | 0.05 | 0.05 | 0.1 | 0.1 | 0.1 | 0.1 | 0.1 | 0.1 | 0.1 | 0.1 | 0.15 |
| $CeO_2$ | 0.05 | 0.05 | 0.1 | 0.1 | 0.1 | 0.1 | 0.1 | 0.1 | 0.12 | 0.16 | 0.2 |
| $Fe_2O_3$ | 0.1 | 0.1 | 0.1 | 0.1 | 0.1 | 0.1 | 0.095 | 0.09 | 0.08 | 0.07 | 0.07 |
| 20% $NaNO_3$ & 80% $KNO_3$ 390° C. 3 h | | | | | | | | | | | |
| surface tension | 763 MPa | | 787 MPa | | | 836 MPa | | | 770 MPa | | 761 MPa |
| MOR | 700 MPa | | 712 MPa | | | 754 MPa | | | 724 MPa | | 709 MPa |
| zone of compressive stress | 82 μm | | 80 μm | | | 80 μm | | | 63 μm | | 50 μm |
| 20% $NaNO_3$ & 80% $KNO_3$ 390° C. 4 h | | | | | | | | | | | |
| surface tension | 785 MPa | | 803 MPa | | | 822 MPa | | | 805 MPa | | 783 MPa |
| MOR | 730 MPa | | 758 MPa | | | 782 MPa | | | 761 MPa | | 737 MPa |
| zone of compressive stress | 100 μm | | 91 μm | | | 87 μm | | | 81 μm | | 65 μm |
| 20% $NaNO_3$ & 80% $KNO_3$ 390° C. 8 h | | | | | | | | | | | |
| surface tension | 814 MPa | | 810 MPa | | | 815 MPa | | | 784 MPa | | 803 MPa |
| MOR | 759 MPa | | 765 MPa | | | 787 MPa | | | 743 MPa | | 745 MPa |
| zone of compressive stress | 120 μm | | 118 μm | | | 102 μm | | | 99 μm | | 82 μm |
| 20% $NaNO_3$ & 80% $KNO_3$ 390° C. 12 h | | | | | | | | | | | |
| surface tension | 799 MPa | | 783 MPa | | | 768 MPa | | | 741 MPa | | 729 MPa |
| MOR | 745 MPa | | 752 MPa | | | 739 MPa | | | 731 MPa | | 699 MPa |
| zone of compressive stress | 150 μm | | 142 μm | | | 120 μm | | | 109 μm | | 105 μm |

What is claimed is:

1. A chemically tempered glass article, the article comprising:
   a thickness of less than 4 mm; and
   a glass composition comprising $SiO_2$, $Al_2O_3$, $Li_2O$, and $Na_2O$, wherein the glass composition comprises the $Li_2O$ in an amount of 4.6% to 5.4% by weight and the $Na_2O$ in an amount of 8.1% to 9.7% by weight, and
   wherein after chemical tempering, the article has both (1) a zone of compressive stress with a thickness of at least 50 micrometers and (2) a surface tension of more than 700 MPa.

2. The article of claim 1, wherein the glass composition comprises $K_2O$ in an amount of 0.05% to 1.0% by weight.

3. The article of claim 1, wherein, prior to chemical tempering, the glass composition further comprises:
   $B_2O_3$ in an amount of 0.1% to 1% by weight,
   $K_2O$ in an amount of 0.05% to 1.0% by weight,
   MgO in an amount of 0% to 0.03% by weight, and
   $SnO_2$ in an amount of 0% to 2.5% by weight.

4. The article of claim 3, wherein the glass composition comprises $SiO_2$ in an amount of 61.8% to 62.0% by weight.

5. The article of claim 3, wherein the glass composition comprises $Al_2O_3$ in an amount of 17.8% to 17.9% by weight.

6. The article of claim 3, wherein the glass composition comprises $SiO_2$ in an amount of 61.8% to 62.0% by weight and $Al_2O_3$ in an amount of 17.8% to 17.9% by weight.

7. The article of claim 3, wherein the glass composition comprises $SnO_2$ in an amount of 0.05% to 1.5% by weight.

8. The article of claim 1, further comprising, after the chemical tempering, ions from an exchange in two or more baths.

9. The article of claim 8, wherein the two or more baths each have at least two different alkali cation species.

10. The article of claim 8, wherein the ions comprise Na ions and K ions.

11. The article of claim 10, wherein the Na ions are from a first bath and the K ions are from a second bath.

12. The article of claim 10, wherein the Na ions and the K ions are from a mixed bath.

13. The article of claim 12, wherein the mixed bath has at least 15 wt % of Na.

14. The article of claim 1, further comprising two non-polished surfaces from floating on a liquid bath.

15. The article of claim 1, wherein the zone of compressive stress has a homogeneous compressive stress that is homogenous over an entirety of the zone of compressive stress.

16. The article of claim 1, wherein the zone of compressive stress has a thickness of at least 80 micrometers.

17. The article of claim 1, wherein the article is configured for use as a cover glass for a device selected from a group consisting of a mobile communication device, a digital camera, a digital photo frame, a personal digital assistant (PDA), and a solar energy device.

18. The article of claim 1, wherein the article is configured for use as a substrate for a touch panel display.

19. The article of claim 1, wherein the zone of compressive stress has a thickness of more than 80 μm and wherein the surface tension is more than 800 MPa.

20. The article of claim 1, wherein the article has a modulus of elasticity that is 83.3 to 84.6 GPa.

21. The article of claim 1, wherein the glass composition has a glass transition temperature that is 502° C. to 525° C.

22. The article of claim 1, wherein the surface tension is more than 750 MPa.

23. The article of claim 1, wherein the surface tension is more than 1,000 MPa.

24. The article of claim 1, wherein the zone of compressive stress has a thickness of more than 80 μm.

25. The article of claim 1, wherein the surface tension is more than 750 MPa, and wherein the zone of compressive stress has a thickness of more than 80 μm.

26. The article of claim 1, wherein the zone of compressive stress has a thickness of more than 80 μm, and wherein the surface tension is more than 1,000 MPa.

27. The article of claim 1, wherein the article resists breakage upon impact by a 20 gram mass of aluminum having a pointed profile traveling at 290 to 540 km/hr.

28. The article of claim 1, wherein the glass composition comprises $SiO_2$ and $Al_2O_3$ in a calculated ratio that is from 2.9 to 4.1 by weight.

29. The article of claim 1, wherein the glass composition comprises $Li_2O$ and $Na_2O$ in a calculated ratio that is from 0.5 to 0.7 by weight.

30. The article of claim 1, wherein the glass composition comprises:
    $SiO_2$ in an amount of 61.8% to 62.0% by weight, and
    $Al_2O_3$ in an amount of 17.8% to 17.9% by weight.

31. The article of claim 1, wherein the glass composition comprises the $Na_2O$ in an amount of 8.5% to 9.5% by weight and the $Li_2O$ in an amount of 4.8% to 5.2% by weight.

32. The article of claim 1, wherein the glass composition comprises a combination of $SiO_2$ and $Al_2O_3$ in a calculated ratio to a combination $Li_2O$ and $Na_2O$ that is from 5.4 to 6.0 by weight.

33. The article of claim 32, wherein the glass composition comprises a combination of $SiO_2$ and $Al_2O_3$ in a calculated ratio to a combination $Li_2O$ and $Na_2O$ that is about 5.8 by weight.

34. The article of claim 1, wherein the glass composition comprises $SiO_2$ and $Al_2O_3$ in a calculated ratio that is from 2.9 to 4.1 by weight and $Li_2O$ and $Na_2O$ in a calculated ratio that is from 0.5 to 0.7 by weight of a totality of the glass composition.

* * * * *